Jan. 6, 1953  H. S. VAN BUREN, JR  2,624,091

SNAP FASTENER STUD INSTALLATION

Filed Aug. 5, 1948

INVENTOR,
HAROLD S. VAN BUREN, JR.
BY Walter J. Jones
ATTORNEY.

Patented Jan. 6, 1953

2,624,091

UNITED STATES PATENT OFFICE 2,624,091

SNAP FASTENER STUD INSTALLATION

Harold S. van Buren, Jr., Cambridge, Mass., assignor to United-Carr Fastener Corporation, Cambridge, Mass., a corporation of Massachusetts Application August 5, 1948, Serial No. 42,566

1 Claim. (Cl. 24—219)

My invention aims to provide improvements in the type of fasteners shown in U. S. Letters Patent Nos. 2,131,347; 2,300,292 and 2,080,379, now well known in the trade as laundryproof fasteners.

One object of my invention is to provide for a thinner, complete fastener installation.

Another object of my invention is to provide an improved stud application for knit goods such as is used in making sweaters, underwear and the like.

Still another object of my invention is to provide a knit goods stud application that is thinner than the one shown and described in U. S. Letters Patent No. 2,131,347.

Referring now to the drawing showing one form of my invention:

Fig. 5 is an enlarged section of the complete installation taken on the line 5—5 of Fig. 1.

Figure 1:
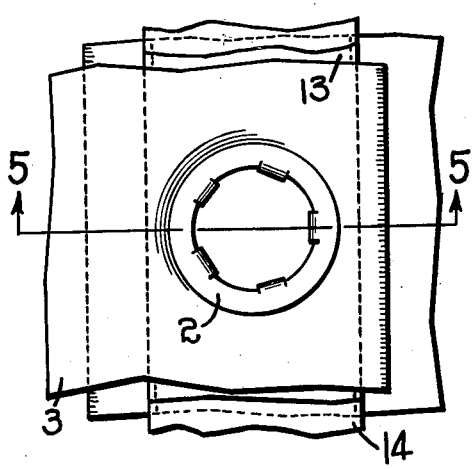
Fig. 1 is a plan view of the complete fastener installation.
Figure 2:
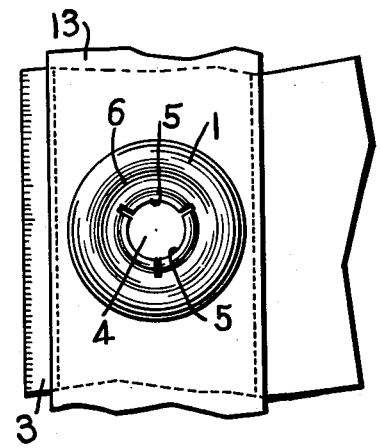
Fig. 2 is a plan view of the socket installation as viewed from the socket side.

Referring now to the particular disclosure of my invention illustrated by the drawings, I have shown a so-called laundryproof snap fastener installation. This installation includes a socket installation (Fig. 2) and a stud installation (Figs. 3 and 4) forming a complete installation as shown in Figs. 1 and 5.

The socket installation is preferably of the type shown in U. S. Letters Patent No. 2,131,347 and includes a socket member 1, an attaching ring 2 and a socket carrying material 3. The socket member 1 has a stud-receiving aperture 4 surrounded by suitable yieldable stud-engaging means 5 and the face of the socket has an annular recess 6, the purpose of which will be described later.

Figure 3:
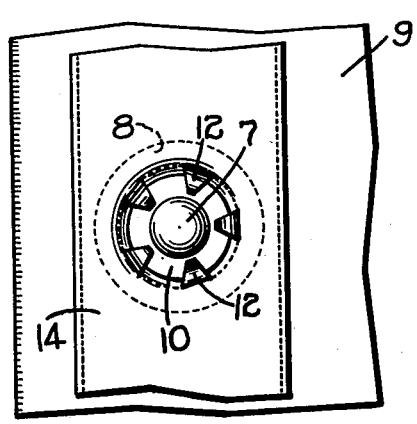
Fig. 3 is a plan view of the stud installation as viewed from the stud side.
Figure 4:
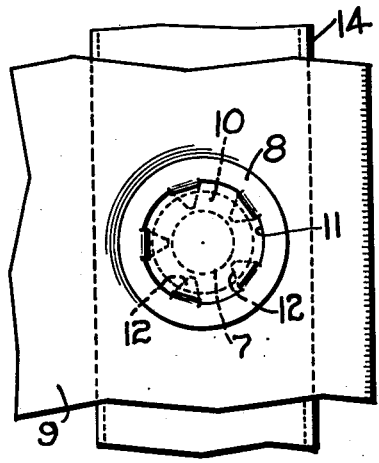
Fig. 4 is a view of the stud installation as viewed from the attaching ring side.
Figure 4:
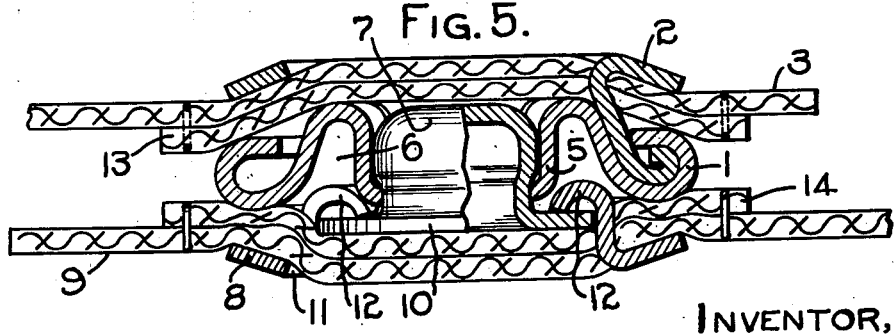

The stud installation includes the main feature making my invention possible and comprises a snap fastener stud 7, an attaching member 8, and a stud-supporting material 9. The stud is of the usual type, but preferably has a very small base flange 10. The attaching member is preferably in the form of a ring having a central aperture 11 and a number of spaced attaching prongs 12 surrounding the aperture 11, as shown in Fig. 1. For assembly of the stud installation, it is merely necessary to support the stud 7 and attaching member 8, by suitable attaching tools, hold the stud-supporting material between them, and then move the tools together, by any suitable means, thereby forcing the ends of the prongs 12 through the material and curling them over the flange 10, as shown in Figs. 3 and 5. With this construction the stud flange is small enough so that it forces the material 9 into the aperture 11 (Fig. 5) and has a tendency to nest with the attaching ring, thereby forming a relatively thin installation.

When the stud and socket installation are in snapped together relation (Figs. 1 and 5), a very thin installation results because of the fact that curled ends of the prongs 12 and the base flange 10 may enter the recess 6 in the socket 1, as best shown in Fig. 5.

The type of fastener installation just described is particularly desirable when the supporting material is knit goods and when a very thin application is required. The conventional type of fastener stud assembly usually cuts the threads of knit goods and permits unraveling of the threads. The pronged ring attachment overcomes this trouble and my invention both overcomes the trouble and provides a thinner installation than anything known heretofore. When knit material is used, it is advisable to provide a reinforcing strip because it strengthens the installation and takes the stretch out of the material adjacent to the fasteners, thus making it easier to unsnap the studs and sockets. I have shown a reinforcing strip 13 in the socket assembly and another strip 14 in the stud assembly.

My invention is particularly useful on knit children's garments, sweaters, and applications where thickness must be kept to an absolute minimum while providing for ready engagement and disengagement of the snap fastener stud and socket.

While I have illustrated and described one preferred embodiment of my invention, I do not wish to be limited thereto, as the scope of my invention is defined in the following claim.

I claim:

A snap fastener stud installation comprising a flexible sheet material support, a stud member having a laterally extending base flange bearing on one face of said sheet material support, and an attaching ring bearing on the opposite face of said sheet material support, the inner edge of said ring being substantially outside any projection of the peripheral edge of said base flange into the plane of said ring, said attaching ring having attaching prongs extending from and spaced about the inner edge thereof through said sheet material support, said prongs being curled over to overlie said base flange to secure said stud member and said attaching ring to opposite faces of said sheet material support and to secure a ring portion of said sheet material support between the peripheral edge of said base flange and said inner edge of said attaching ring.

HAROLD S. VAN BUREN, JR.

REFERENCES CITED

The following references are of record in the file of this patent:

UNITED STATES PATENTS

| Number | Name | Date |
| --- | --- | --- |
| 447,346 | Pringle | Mar. 3, 1891 |
| 2,131,347 | Fenton | Sept. 27, 1938 |
| 2,393,219 | Griffin | Jan. 15, 1946 |
| 2,509,501 | Huestler | May 30, 1950 |

FOREIGN PATENTS

| Number | Country | Date |
| --- | --- | --- |
| 148,919 | Germany | Mar. 1, 1904 |